Oct. 27, 1925.
F. H. HOARE
LINEAR MEASURE OR SCALE
Filed March 12, 1924
1,558,879
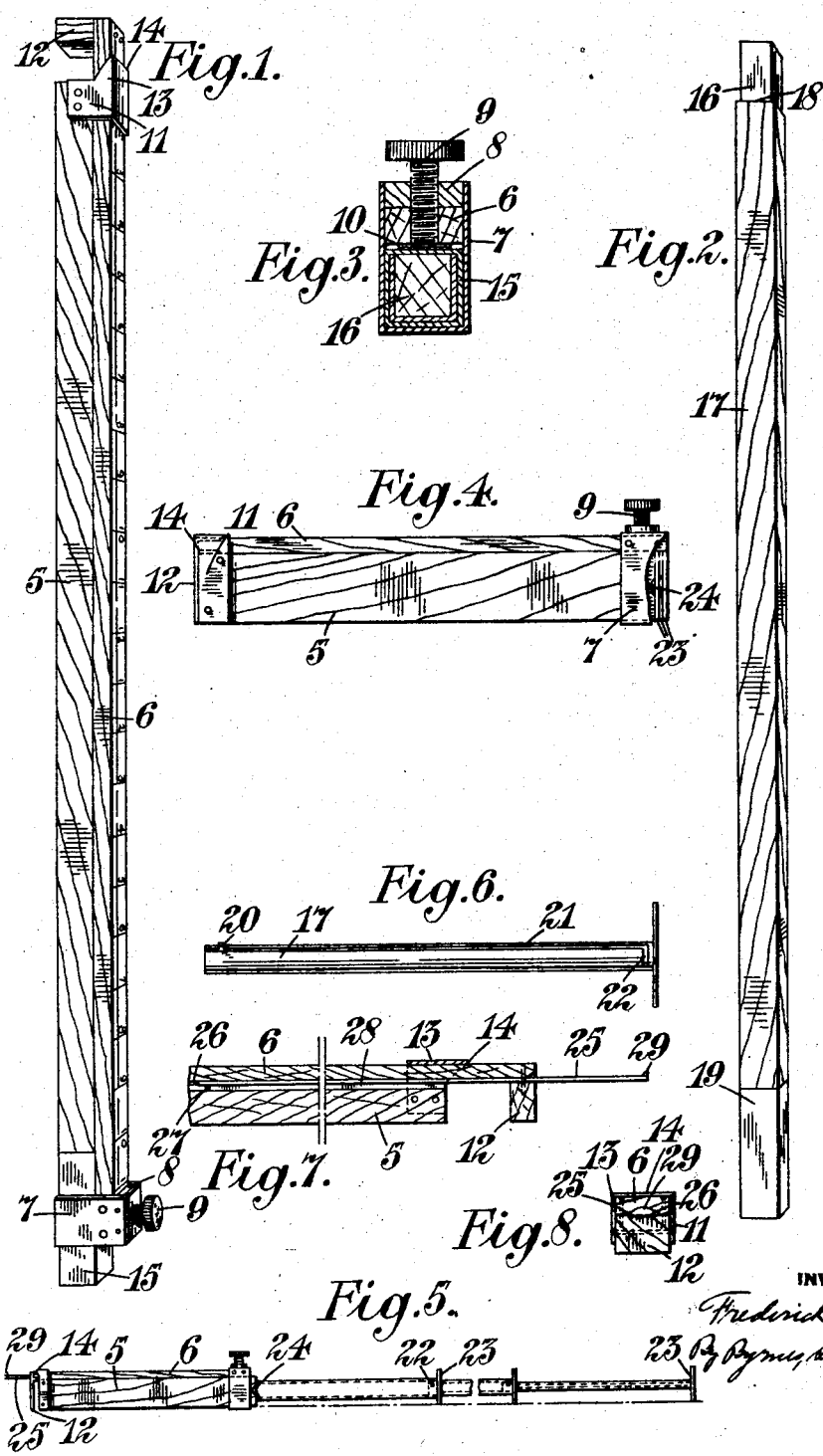

Patented Oct. 27, 1925.

1,558,879

UNITED STATES PATENT OFFICE.

FREDERICK HENRY HOARE, OF LONDON, ENGLAND.

LINEAR MEASURE OR SCALE.

Application filed March 12, 1924. Serial No. 698,674.

*To all whom it may concern:*

Be it known that I, FREDERICK HENRY HOARE, a subject of the King of England, residing in London, England, have invented certain new and useful Improvements in Linear Measures or Scales, of which the following is a specification.

This invention relates to linear measures or scales of the type comprising a main body-portion, a sliding portion secured thereto by guides which permit the sliding portion to be extended from one end of the main portion in the direction of the length thereof, and clamping means arranged to secure the sliding portion in any desired position of adjustment relatively to the main body portion. Several forms of such measuring instruments have been proposed and it is an object of the present invention to provide an extensible measure or scale of the above class which is of simple and improved construction and which is designed to enable measurements to be taken or compared quickly and accurately.

A linear measure or scale according to this invention comprises a main body-portion, a sliding strip or rod extensible from one end of the main portion in the direction of the length thereof and having a linear scale thereon reading from the outer end, as the zero point of the scale, inwards against a fixed index secured to the main portion and arranged to read against the zero of the scale when the members are in closed position, and means to clamp the sliding member at any desired position of adjustment with or without one or more extension units which are adapted to form a continuation of the main portion.

According to another feature of this invention the free end of the said sliding scale is provided with an abutment which, when the rule is closed, engages with and forms a continuation of the main body-portion, and the fixed index extends beyond the end of the main portion by an amount equal to the width of the abutment to register with the zero of the scale when closed so that a measurement read against the index on the one scale is a true measurement of the length between the end of the main portion and the inner face of the abutment and also of the amount of extension of the sliding portion beyond the index.

Other features of the invention will be hereinafter described and pointed out in the appended claims.

Two preferred constructions of the device according to this invention will now be described with reference to the accompanying drawing in which—

Figure 1 is a perspective view of one construction of rule;

Figure 2 is a perspective view of an extension unit therefor;

Figure 3 is a cross-section taken through the clamp and socket with the extension unit in position;

Figure 4 is a side elevation of a modified construction of rule with a part of the clamp band broken away;

Figure 5 is a view similar to Figure 4 but drawn to a smaller scale and showing the telescopic extension units extended;

Figure 6 is a detail view of one of the telescopic extension units;

Figure 7 is a detail sectional view of one end of the scale shown in Figure 1 illustrating a modification; and Figure 8 is an end view of the scale shown in Figure 7.

Like reference numerals refer to like parts in the several figures.

Referring more particularly to Figures 1–3 the main body-portion 5 comprises a strip or rod of any convenient length, say two feet less the width of the abutment hereinafter referred to, and may be graduated or not as desired. The sliding strip 6 is provided at one end with a guide-member in the form of a band 7 which is secured thereto and which embraces the body-portion. This guide member is formed with or secured to a metal block 8 which has a screw-threaded hole therein to receive the clamping screw 9. A resilient metal plate 10 is secured along one edge on the underside of the sliding strip 6 to lie beneath the end of the clamping screw and so distribute the pressure thereof and prevent indentation of the body-portion. A second guide-member 11 for the sliding member is secured to one end of the main body-portion and embraces the sliding strip.

The free end of the sliding member is furnished with an abutment 12 which when the rule is closed, forms in effect a continuation of the strip comprising the main body-portion. In the example illustrated the width of the abutment is half-an-inch and the total length of the sliding strip is two feet, which is graduated in inches as shown reading from the abutment end inwards, the graduations preferably being marked 1—12, 1—12 to facilitate calculations in feet. The guide-member 11 is formed with a projecting nose-piece 13, the edge 14 of which forms a fixed index against which the graduations on the sliding scale can be read and this nose-piece is such that when the rule is closed the index reads against the zero of the scale. It will be seen, therefore, that when the rule is extended the gap between the jaws formed by the inner face of the abutment and the end of the body-portion will be equal to the distance between the free end of the sliding strip and the edge 14 of the nose-piece which forms the fixed index and thus any measurement read on the aforesaid graduated scale against the index is a true indication of the amount of extension of the scale and also of the distance betwen the aforesaid jaws.

The end of the body-portion 5 remote from the index is provided with a metal socket-piece 15 which is adapted to receive the metal-faced end 16 of the extension unit 17 shown in Figure 2. The extension unit in the example shown measures two feet from the shoulder 18 to the end of the socket-piece 19 so that when fitted to the body-portion 5 the effective length of the rule is increased by a definite known amount, viz, two feet. Other extension units of one foot each or multiples thereof may be provided, each being fitted with socket-connections so that the effective length of the rule may be increased as desired according to the purpose for which it is required.

It will be understood that the measurements given herein are by way of example only and that the rule and extension pieces may be of any convenient length desired and that the scale may be graduated in units other than inches. The extension units may be stamped with their length and any other connecting means may be employed instead of the socket-connections described. Thus the extension-pieces may be hinged to the body-portion and arranged to be folded thereon.

Referring now to Figures 4-6, which illustrate a modified construction of rule according to this invention and of an overall length when closed of say six inches, the body-portion 5 is hollow and the extension units 17 are arranged to telescope therein. The arrangement of the sliding strip 6 with the guide members 7 and 11 and clamping screw 9 is substantially the same as that already described with reference to Figure 1. The abutment 12 is formed by a metal piece secured to the end of the strip 6 and the edge 14 constituting the fixed index reads against the zero of the scale when the rule is closed as shown in Figure 4. Each extension unit is constituted by a metal tube and is provided with a fixed pin 20, see Figure 6, which engages a slot 21 in the surrounding tube, the pin of the first unit engaging a slot in the wall of the cavity in the body-portion, and each slot has a portion 22 at right angles thereto with which the pin of the neighbouring tube is adapted to engage when the units are extended by giving the same a quarter twist. In the example illustrated each extension unit is arranged to give an extension of five inches.

Secured to the free end of each unit is a square metal plate 23 an edge of which is arranged to lie in the same plane as that of the wall of the body-portion as shown so that when the units are extended the rule lies flat on a surface and enables measurements to be taken with ease and accuracy. Recesses 24 in the end-plates and body-portion enable the extension units to be readily withdrawn.

In the modification illustrated in Figures 7 and 8 an additional slide 25 is provided on the main slide 6. This slide may be of steel and is preferably let into a recess 26, which may be undercut as shown, on the underside of the slide 6 and is provided at its inner end with a stop 27 which is arranged to run in a groove 28 in the body-portion 5. The stop 27 is adapted to engage the abutment 12 and prevents withdrawal of the slide beyond that point. A notch or projection 29 on the outer end or other convenient part, such as on the underside, of the slide 25 enables the latter to be drawn out when desired. The slide 25 may be of any convenient length, say, half the length of the main slide, and may be graduated in any desired units, being arranged to read from the outer end inwards and adapted to close flush with the end of the main slide.

The rules herein described may be made of any desired material and shape and of any convenient length. The body portion may be made in the form of a walking-stick in which case the sliding portion may be a segment thereof slidably connected therewith or it may be in the form of a rod or tube arranged to telescope within the stick, the ferrule of the stick constituting the abutment. Extension pieces may be provided to fit on the other end of the stick or they may be arranged to telescope therein as hereinbefore described. I am aware that it has been proposed to provide a horse measure in the form of a walking-stick in which a slide piece comprising a graduated measure and a part hinged thereto and arranged to be fixed at right angles thereto, is arranged to be withdrawn from the handle end of the stick and I make no claim to such an arrangement.

It will be seen that the device according to this invention provides a combined rule and caliper gauge of simple construction, and that a rod of any desired length can be obtained of which the total length can be read at a glance.

I claim:—

1. A linear measure or scale comprising in combination a main body-portion, a plurality of extension-units adapted to form a continuation of said body-portion, a member slidably secured to said body-portion and extensible from one end thereof in the direction of its length and having a linear scale thereon reading from the outer end as the zero point of the scale inwards, a second graduated scale slidably secured to said sliding member and arranged to be extensible from the said outer end to form a continuation of said sliding member, an abutment on the free end of said first sliding member adapted to form a continuation of said body-portion, an index fixed to said body-portion and arranged to project beyond the end thereof to register with the zero of said first scale when said sliding member is retracted and a clamping screw on said sliding member adapted to engage the body-portion to lock the said sliding member in any desired position of adjustment relative thereto, substantially as set forth.

2. A linear measure or scale comprising in combination a main body-portion, a sliding member carried thereby and movable from one end of the main portion in the direction of the length thereof and having a linear scale thereon reading from the outer end, as the zero point of the scale inwards, an abutment on the free end of the said sliding member which, when said sliding member is retracted, engages with and forms a continuation of the main body-portion, means to clamp the sliding member at any desired position of adjustment relative to the main body-portion, and a fixed index on the main portion and extending beyond the end thereof by an amount equal to the width of the abutment to register with the zero of the said scale when said sliding member is retracted so that a measurement read against the index on the one scale is a true measurement of the length between the end of the main body-portion and the inner face of the abutment and also of the amount of extension of the sliding member beyond the index.

3. A linear measure or scale comprising in combination a main body portion, an extension unit adapted to form a continuation from one end of said body portion, a sliding member carried by said portion and movable from the other end thereof in the direction of its length and having a linear scale thereon reading from the outer end, as the zero point of the scale inwards, an abutment secured to one end of the said sliding member which when said sliding member is retracted engages with and forms a continuation of the main body portion, means to clamp the sliding member at any desired position of adjustment relative to the main body portion, and an index secured to the main portion and extending beyond the end thereof by an amount equal to the width of the abutment to register with the zero of said scale when said sliding member is retracted so that the measurement read against the index on the one scale is a true measurement of the length between the end of the main body portion and the inner face of the abutment and also of the amount of extension of the sliding member beyond the index.

4. A linear measure or scale comprising in combination a main body portion, an extension unit adapted to form a continuation from one end of said body portion, a sliding member carried by said body portion and movable from the other end thereof in the direction of its length and having a linear scale thereon reading from the outer end, as the zero point of the scale inwards, an abutment on the free end of the said sliding member which when said sliding member is retracted engages with and forms a continuation of the main body portion, means to clamp the sliding member at any desired position of adjustment relative to the main body portion, a fixed index on the main portion and extending beyond the end thereof by an amount equal to the width of the abutment to register with the zero of the said scale when said sliding member is retracted so that a measurement read against the index on the one scale is a true measurement of the length between the end of the main body portion and the inner face of the abutment and also of the amount of extension of the sliding member beyond the index, and a socket on the end of the main body portion remote from the index adapted to receive said extension unit whereby said extension unit is detachably secured to said body portion.

5. A linear measure or scale comprising in combination a main body portion, a plurality of extension units adapted to form a continuation from one end of said body portion, a sliding member carried by said body portion and movable from the other end thereof in the direction of its length and having a linear scale thereon reading from the outer end inwards, an index secured to the main portion and arranged to read against the zero of the said scale when the sliding member is in its retracted position and a second sliding scale carried by and movable from the free end of the said sliding member in the direction of the length thereof and graduated to read from the outer end inwards.

6. A linear measure or scale comprising in combination a hollow main body portion, a telescopic extension adapted to form a continuation from one end of said body portion, said extension unit being adapted to telescope within said hollow body portion, a member slidably secured to said body portion to be extensible from the other end thereof in the direction of its length and having a linear scale thereon reading from the outer end inwards, and an index secured to said body portion and arranged to read against the zero of the said scale when the member is in its retracted position.

7. A linear measure or scale comprising in combination a hollow main body portion, a plurality of telescopic extension units adapted to form a continuation from one end of said body portion, said extension units having bayonet joint connections one with the other and being adapted to telescope within said hollow body portion, a member slidably secured to said body portion to be extensible from the other end thereof in the direction of its length and having a linear scale thereon reading from the outer end inwards, an abutment on the free end of said member, and an index secured to said body portion and arranged to read against the zero of the said scale when the said member is in its retracted position.

8. A linear measure or scale comprising in combination a hollow main body portion, a plurality of telescopic extension units adapted to form a continuation from one end of said body portion, said extension units having bayonet joint connections one with the other and being adapted to telescope within said hollow body portion, a member slidably secured to said body portion to be extensible from the other end thereof in the direction of its length and having a linear scale thereon reading from the outer end inwards, an abutment on the free end of said member, a fixed index secured to said body portion and arranged to read against the zero of the said scale when the said member is in its retracted position, and an end piece on each extension unit whereof one edge lies in the same plane as that of a side wall of the main body portion when the said extension units are twisted to lock them in their extended positions.

9. A linear measure or scale comprising in combination a main body portion, a plurality of extension units adapted to form a continuation from one end of said body portion, a member slidably secured to said body portion, and extensible from the other end thereof in the direction of its length and having a linear scale thereon reading from the outer end as the zero point of the scale inwards, an abutment on the free end of said sliding member adapted to form a continuation of said body portion, an index fixed to said body portion and arranged to project beyond the end thereof by an amount equal to the width of the abutment to register with the zero of said scale and a clamping screw on said sliding member adapted to engage a yielding metal strip to lock the said sliding member in any desired position of adjustment relative to said body portion.

In testimony whereof I affix my signature.

FREDERICK HENRY HOARE.